(12) United States Patent
Sharma et al.

(10) Patent No.: US 10,192,084 B1
(45) Date of Patent: Jan. 29, 2019

(54) SYSTEM AND METHOD FOR AUTHENTICATING OBJECTS WITH AUTHORIZED ACCESS CONTROLS

(71) Applicant: Zortag, Inc., Great Neck, NY (US)

(72) Inventors: Satya Prakash Sharma, East Setauket, NY (US); Joseph Marino, Port Jefferson Station, NY (US); Charles Gary Furedy, Roswell, GA (US)

(73) Assignee: Zortag, Inc., Great Neck, NY (US)

( * ) Notice: Subject to any disclaimer, the term of this patent is extended or adjusted under 35 U.S.C. 154(b) by 0 days.

(21) Appl. No.: 15/878,454

(22) Filed: Jan. 24, 2018

(51) Int. Cl.
G06K 7/08 (2006.01)
G06K 7/10 (2006.01)
G06F 17/30 (2006.01)

(52) U.S. Cl.
CPC ... G06K 7/10366 (2013.01); G06F 17/30312 (2013.01)

(58) Field of Classification Search
CPC .................. G06K 7/10366; G06F 17/30312
USPC ................................................. 235/451, 380
See application file for complete search history.

(56) References Cited

U.S. PATENT DOCUMENTS

| | | | | |
|---|---|---|---|---|
| 9,710,836 B1* | 7/2017 | O'Malley | .......... | G06Q 30/0607 |
| 2005/0010776 A1* | 1/2005 | Kenen | .................. | G06Q 20/341 |
| | | | | 713/176 |
| 2014/0338405 A1* | 11/2014 | Nazzari | .................. | E05B 15/00 |
| | | | | 70/15 |
| 2015/0259951 A1* | 9/2015 | Nazzari | ................. | G09F 3/0364 |
| | | | | 70/15 |

* cited by examiner

*Primary Examiner* — Karl D Frech
(74) *Attorney, Agent, or Firm* — Kirschstein, Israel, Schiffmiller & Pieroni, P.C.

(57) ABSTRACT

Objects are identified by authentication tags, each configured with an authentication key that includes a first dataset comprised of a random distribution of three-dimensional elements, and with a second dataset comprised of machine-readable data elements. The authentication keys are readable by image capture and/or RFID reading devices, at least one of which is authorized to read at least one of the keys under predetermined conditions. An object is deemed genuine when the device reading a key has been authorized, and when the reading is performed when the conditions have been met.

10 Claims, 16 Drawing Sheets

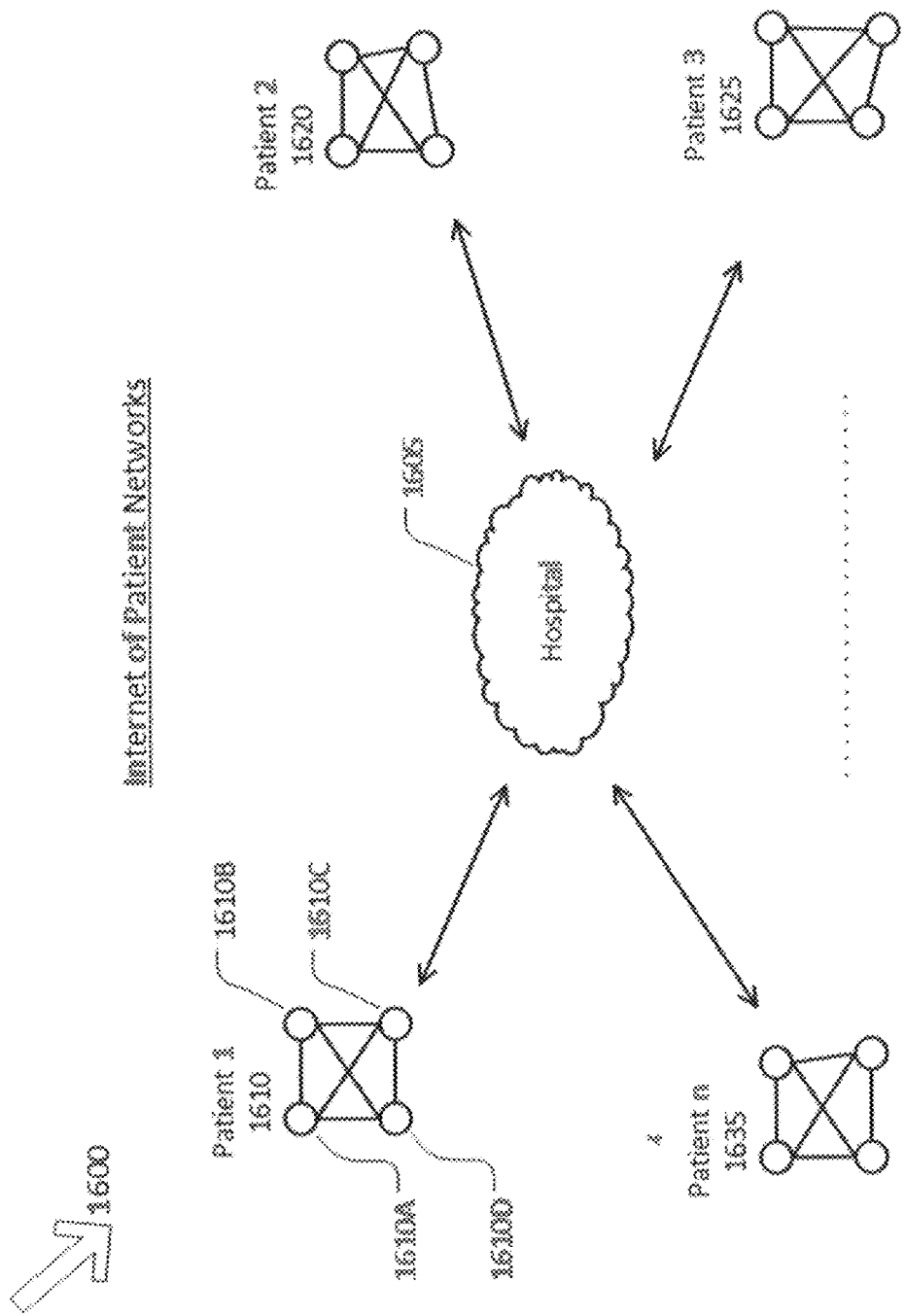

SYSTEM AND METHOD FOR AUTHENTICATING OBJECTS WITH AUTHORIZED ACCESS CONTROLS

BACKGROUND OF THE INVENTION

Identifying an object and information about the object, authenticating that the information and the object are genuine, and authorizing who can access the information are major organizational and individual challenges in the digital economy. In addition, it is critical that security and privacy are preserved during flow of the information among an authorized entity, the object, and an information system holding the identity of, and the information about, the object. Preventing unauthorized access, use, disclosure, disruption, modification, inspection, recording, or destruction of information is critical in all business and personal transactions.

There are various ways that an object can be identified. Some of these include associating the object with a barcode, radio frequency identification (RFID) device, or a magnetic stripe, as employed on credit/debit/ATM cards, etc. All of these methods connect a physical object to information systems.

The barcode gives a name to any object and allows automatic capture of that name through various scanning devices, also known as scanners or readers. The readers may detect return laser light scanned across the barcode, or may capture return light from the barcode as an image. In barcode symbology, an object may be identified by a series of elements of different light reflectivity printed on a label. The elements are spaced apart widthwise of the label along a horizontal direction to form a one-dimensional (1D) barcode or symbol. The elements may be configured as rectangular bars having variable widths and spaced apart from one another to form other elements, i.e., spaces, which also have variable widths. The heights of the bars and spaces in the 1D barcode carry no information. The printed bars are typically colored with a foreground color, typically black, while the spaces are colored with a contrasting background color, typically white. The particular layout of the bars and spaces, as well as the sizes of the widths of the bars and spaces, describe one of many different schemes or symbologies in which the identification data is encoded and decoded. To encode additional information, a plurality of 1D barcodes may be stacked along the vertical direction, or a combination of the elements may be arranged along both the horizontal and vertical directions to encode the additional information to form a two-dimensional (2D) barcode or symbol. In an earlier disclosure, U.S. patent application Ser. No. 15/338,584, whose disclosure is hereby incorporated herein by reference thereto, a 5-dimensional barcode was described that can carry significant more information than either a 1D or a 2D barcode.

RFID involves a small chip and an antenna to provide identification of an object. The chip may carry data of up to 2,000 or more bytes. In this respect, it has the capability of storing more data than a barcode. The RFID device or tag serves the same purpose as a barcode or a magnetic stripe and provides a unique identifier for that object. Just as a barcode must be scanned to retrieve the information, the RFID device must be scanned or read by an RFID reader to retrieve the identifying information. However, the RFID tag does not need to be in the line of sight relative to the scanner and can work within several feet of the scanner.

The magnetic stripe stores data by modifying the magnetism of tiny iron-based magnetic particles on a band of magnetic material on the card. The magnetic stripe card, sometimes also called a swipe card or magstripe, is read by swiping past a magnetic reading head. Magstripe may also contain an RFID device, a transponder device, and/or a microchip. Such cards are mostly used for business premises access control or electronic payment. Obviously, credit/debit/ATM cards must be swiped through a special reader to retrieve the stored data.

However, none of these identification technologies can serve to prevent counterfeiting of products or objects. For example, 1D and 2D barcodes printed on labels are read by specialized electro-optical readers for product identification. RFID tags are affixed to products and are interrogated by specialized RFID readers. Magnetic stripes and holograms are also read by specialized card readers.

Most of these identification techniques, however, can be easily duplicated and defeated by counterfeiters. For example, printed barcoded and RFID tags can be easily duplicated or copied and can be tampered with by unscrupulous parties. Barcodes, RFID tags, and other identification technologies can identify, but not authenticate, an associated object. Holograms can be reverse-engineered. Magnetic stripe data can be easily read and reused. These identification technologies are generic, and any generic technology can be copied, duplicated, or reverse-engineered, thereby compromising their anti-counterfeiting function. In addition, most known anti-counterfeiting techniques require either specialized proprietary readers, depend on the knowledge of users, or need to be analyzed in a laboratory setting.

In U.S. Pat. No. 9,082,062 B2 whose disclosure is hereby incorporated herein by reference thereto, a method of authenticating an object was described that creates an authentication pattern signature for the object to be authenticated, associating a random distribution of three-dimensional (3D) elements with the object, aiming a portable, handheld, image capture device at the object to capture return light from the elements as one or more images, verifying from the image(s) that the elements are three-dimensional, processing the image(s) to generate an image pattern of the elements, comparing the image pattern with the authentication pattern signature, and indicating that the object is authentic when the image pattern matches the authentication pattern signature. Further details of an exemplary tag, system and method of authenticating articles in situ are disclosed in said patent.

As shown in FIG. 1, an authentication system 100 may include a label or tag 10 affixed to an object 12 in situ. The tag 10 is thus associated with the object 12 to be authenticated, and any object may be authenticated. Preferably, the tag 10 has a substrate, e.g., paper, foil, or film, and an adhesive layer 20 on the underside of the substrate is employed for adhering the tag 10 to the object 12. The tag 10 has a first dataset 14 configured as a random distribution of three-dimensional (3D) elements P1, P2, P3, P4, P5, P6 and P7 on the tag 10, and a second dataset 16 configured as data elements on the tag 10. The data elements of the second dataset 16 are preferably also affixed to the tag, either adjacent to, or superimposed on, the first dataset 14. The data elements are machine-readable, for example, they can be light-reflective. Advantageously, the second dataset 16 is a barcode symbol printed on the tag, but could also be a serial number of alphanumeric characters, or a radio frequency identification (RFID) tag, or a magstripe.

The 3D elements comprising the first dataset 14 are configured as a plurality of light-modifying particles and/or bubbles that can have any shape, color, material, interior structure (hollow or solid), or size. Such 3D elements may have characteristic colors for subsequent image processing and analysis. The 3D elements may be applied to the tag 10, e.g., either by being ink jet-printed on the tag, or by being applied in a curable medium 18 on the tag, or by being adhered to the tag. The 3D elements may also be applied or adhered directly to the object 12, or may be applied or adhered directly to a card or tag remote from the object 12. The light-modifying particles are either optically reflective or retro-reflective, or scattering, or absorptive over one or more different wavelengths to exhibit different colors.

The 3D elements can be of any number and can be configured with different geometrical shapes, such as rectangular, triangular, circular, or oval areas, on the tag. The 3D elements can be mutually spaced apart or contact one another. The 3D elements can be deposited in a single layer or in multiple layers on the tag, or can be partially or fully embedded in the medium 18, and may be overlaid with a transparent overcoat for protection.

A portable, handheld, mobile device is preferably an image capture device that is preferably aimed at the first and second datasets 14, 16 to capture return light from the 3D elements and the machine-readable data elements. The return light from the datasets can be captured simultaneously or consecutively. Advantageously, the image capture device is a mobile electronic device having a solid-state imaging module of the type conventionally found in consumer electronic digital cameras. The mobile electronic device is typically a cellular telephone or smart phone that has a built-in imaging module, but can also be a personal digital assistant (PDA), a tablet, a smart watch, a pair of smart glasses, a computer, an e-reader, a media player, or like electronic device having a built-in imaging module, especially one that is normally readily at hand to the average user. No special skill set is required for the user to capture the return light from the 3D elements and the data elements by simply taking one or more images or pictures of the 3D elements and the data elements. If the second dataset is in the form of an RFID chip embedded in the tag, then the same mobile device that captures the image(s) of the first dataset of 3D elements may also read the data stored in the RFID chip since most image-based mobile devices now also have built-in RFID readers.

The authentication pattern signature for the object may be stored in an addressable database remotely from the object. The database stores a multitude of other authentication pattern signatures for other objects. When read, the second dataset 16 serves as an address identifier that identifies an address for the authentication pattern signature in the remote database, thereby enabling the database to be interrogated only at that address, rather than having to interrogate every authentication pattern signature in the database. This greatly accelerates object authentication and improves field performance. In another embodiment, the authentication pattern signature for the object, or at least part of the authentication pattern signature, is locally stored on the object, preferably as part, or the entirety, of the second dataset 16 on the tag. Advantageously, the second dataset 16 may be a two-dimensional barcode symbol printed on the tag, or data stored in an RFID chip embedded in the tag. When the second dataset 16 is read by the same image capture device that read the first dataset 14, the image pattern is quickly compared with the locally stored part of the authentication pattern signature, thereby even further accelerating article authentication performance.

The data elements are machine-readable, for example, they can be light-modifying, as described above, or can be readable by the built-in RFID reader. When the data elements reflect and absorb light, the same image capture device that captured return light from the first dataset 14 can be used to capture light from the second dataset 16.

As mentioned above, no two objects 12 can have the same exact first dataset 14. Identifying and authenticating the object 12, or any other article of commerce, such as a document, an ID card, a payment card, verifies the genuineness of the object and the trust between two interacting parties, e.g. between the consumer and the branded object, or between the organization issuing the object and the prospective recipient of the object.

In certain situations, it is required and advisable that only some users and only some electronic devices have access to the information associated with the datasets 14 and 16. While the electronic device equipped with the imaging module may read the barcode or the RFID tag encoded in the second dataset 16, the associated information content and the information encoded in the first dataset 14 must not be divulged to unauthorized devices, organizations, or individuals. For example, if a customer has purchased an expensive painting from a fine art auction entity that has a tag 10 affixed to it, the owner alone may like to authenticate the painting after acquisition of the painting in addition to the auction house. If such a painting is stolen and then recovered, the owner may claim that the painting indeed belongs to him/her because only his electronic device has the authorization to scan the tag 10.

Another example of limiting the access is that of an article of value that has the tag 10 affixed to it in order to assure the authenticity of the object. If it is delivered to an individual or organization, the sending party may like to make sure that the authentic object has been received by the said individual only. Only the authorized electronic device of the receiving party may scan/read the object, authenticate it, and acknowledge it. If other electronic devices scan/read the object, the acknowledgement must fail.

Still another example can be will or trust documents that may be set up by an individual. To assure that the will or trust documents cannot be forged, a tag 10 is affixed to each such document. The writer of the will and trust may limit access to who can authenticate the document to the trustee's electronic device or electronic devices of the individuals who are the beneficiaries named in the will or trust.

Still another example can be ATM, ID, or payment cards. There have been numerous cases of counterfeiting such cards. Most cards now incorporate an electronic chip on the card known as an EMV (Europay, MasterCard, and Visa) chip to prevent counterfeiting. Using an EMV chip+PIN (Personal Identification Number) at a physical point of sale (POS) location reduces card-present (CP) fraud significantly, but does not address the fraudulent use of payment data when there is no direct connection between the chip reader and the card, such as when the data is entered into an e-commerce application. Such fraud, termed card-not-present (CNP) fraud, remains an increasing problem. In order to assure that such transactions cannot be forged, the tag 10 can be affixed to, or embedded in, each such card.

For CNP transactions, the card holder may input the credit card information into e-commerce sites as is current practice and may capture the image of the associated fingerprint tag 10 and/or may read the second dataset, by using a smart phone. Software verifies from the image(s) that the elements are 3D. The captured fingerprint information in CNP transactions is encrypted and then double authenticated with the encrypted fingerprint information stored in the remote database, assuring that counterfeit cards cannot be used in any transaction at any location. If the authorization to scan the tag 10 is only limited to the card holder's smart phone or another mobile electronic device, then it guarantees that no fraudulent CNP transaction can proceed. Since the captured fingerprint information in all transactions and the stored fingerprint in the remote database are encrypted, man-in-the-middle attacks are also not possible.

There are a number of other cases where it is essential that the authorization to scan and the access to stored information about the document, object, or article of commerce should be limited to an individual, an entity, or a few people. In addition, some authorized users may have only partial authorization to access some of the information, but not the entire information, about an object.

BRIEF DESCRIPTION OF THE DRAWINGS

FIG. 16 is a diagram that shows the internet of patient networks that a hospital can create and manage to improve patient outcome.

DETAILED DESCRIPTION OF THE PREFERRED EMBODIMENTS

Figure 1:
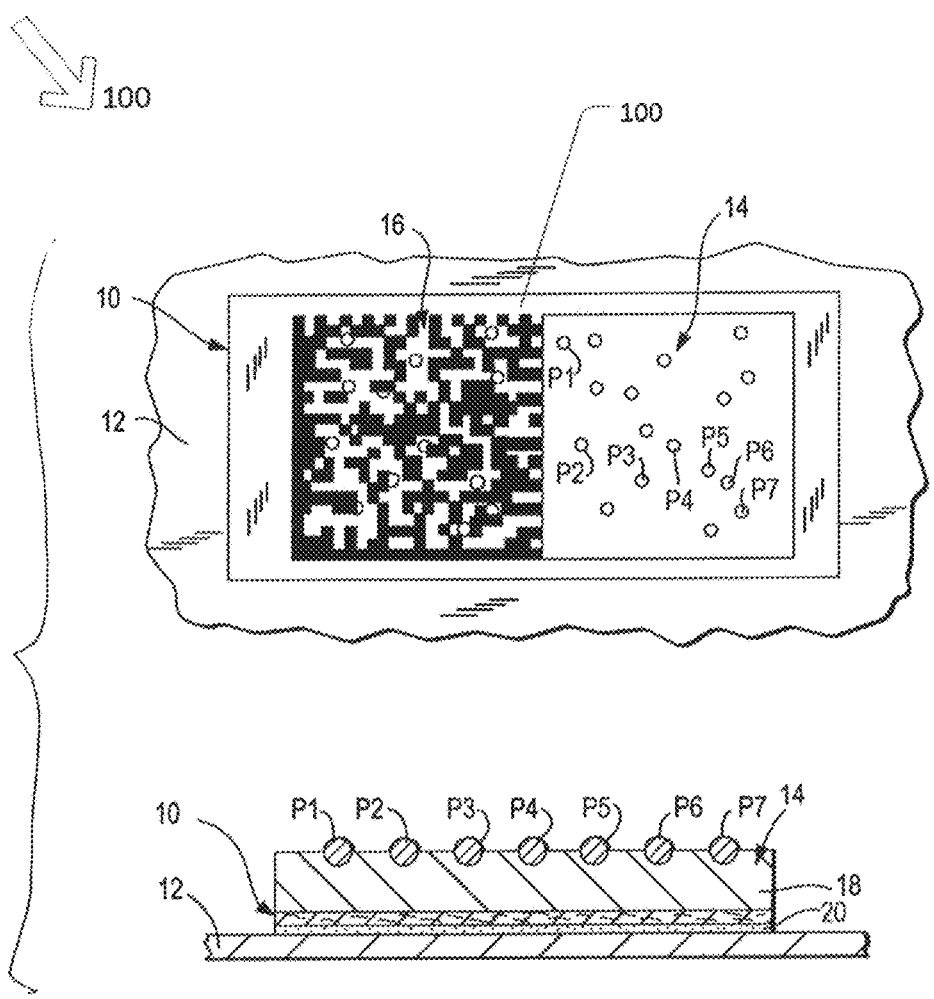
FIG. 1 is a set of views depicting an exemplary authentication tag or key for association with an object to be authenticated.
Figure 2:
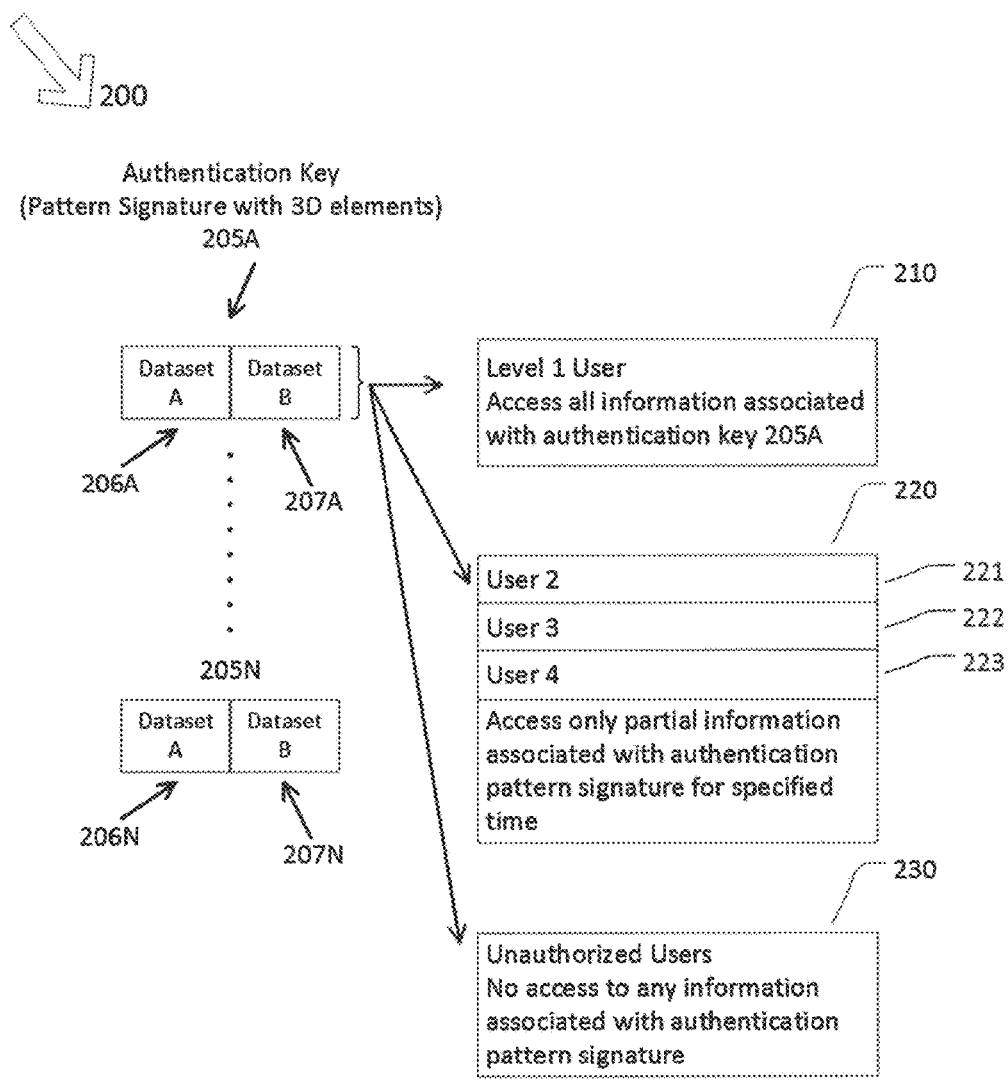
FIG. 2 is a diagram that illustrates the types of users that can have access to information about the object.

Reference numeral 200 in FIG. 2 is a diagram that illustrates the types of users that can have access to the information about an item/object/article or digital/physical assets. As described earlier, authentication keys 205A . . . 205N are analogous to the aforementioned tags 10, and each key or tag has two datasets. First datasets 206A . . . 206N are analogous to the aforementioned first datasets 14 and constitute randomly distributed 3D particles that modify light. Second datasets 207A . . . 207N are analogous to the aforementioned second datasets 16 and identify the first datasets, and could be a serial number of alphanumeric characters, or an RFID tag, a magstripe, or a barcode. Each authentication key 205A . . . 205N is unique and very difficult to reproduce by anyone. This key makes an article of commerce, object, document, or card, etc., a unique item. The first datasets 206A . . . 206N are stored in a remote database addressable by the second datasets 207A . . . 207N. In addition to the first datasets, additional information content is also stored at the address locations of the second datasets.

However, none of the additional information content is accessible to any electronic device unless the first dataset image information sent by the electronic image capture mobile device matches the stored image in the remote database. The electronic devices that can access the information associated with the authentication keys are restricted, and the information that may be accessible by the electronic devices is also restricted, based on the need and the level of security that the article owner or digital/physical asset owner desires.

Thus, an electronic device user 210, also known as a level 1 user or a master user, can access all the information associated with an authentication key. The level 1 user 210 also may be authorized to modify the information content associated with the authentication key and can also instruct and send commands to control other devices that depend on, or need the information associated with, the authentication key. Other authorized users 220 may have access to only part of the information associated with the authentication key. For example, user 2, as shown by numeral 221, may have access to only part of the information associated with the authentication key. User 3, as shown by numeral 222, may have access to some other part of the information associated with the authentication key. User 4, as shown by numeral 223, may have access to yet another piece of information that may not be accessible to either the user 221 or 222. Any other users 230 that have not been authorized by the master user, or the article owner, or the digital or physical asset owner, may have no access to any part of the information, or to a very limited piece of information if any.

Figure 3:
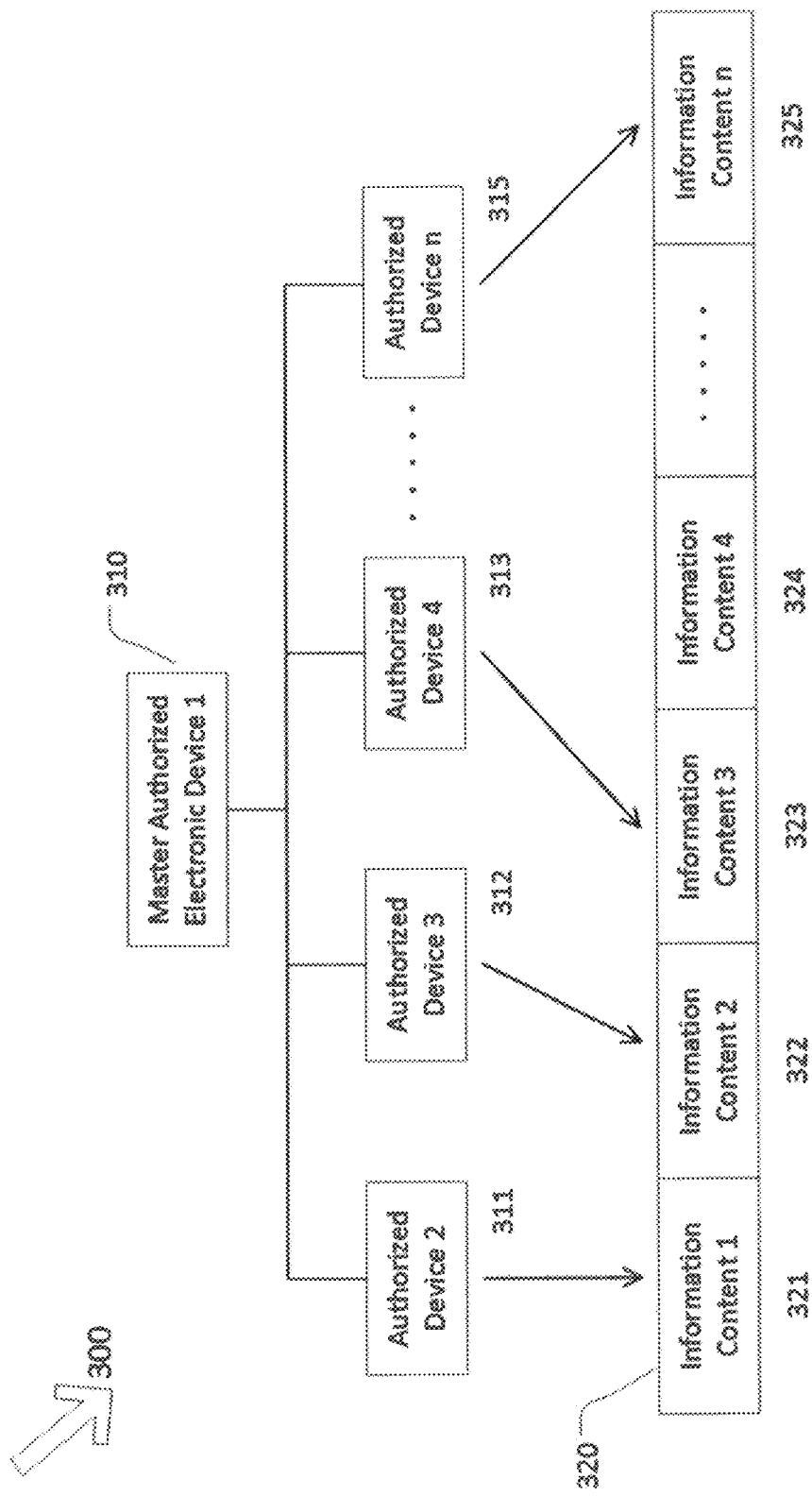
FIG. 3 is a diagram that illustrates how authorization and access control is managed.

Reference numeral 300 in FIG. 3 is a diagram that illustrates how authorization and access control is managed. The authentication key is the required key to authorization. The authentication key can be affixed to an article, a document, an ID card, a payment card, or any object. This key may also be in the physical possession of an individual or an entity. This key can be in the form of a payment card, a driver's license, an ID card, or a key to access data stored in a computer, or attached to any item of value under the control of an individual or an entity. In this case, this key is not available or visible to anyone other than the individual or entity who owns this key. However, if this key is attached to an article of commerce, then this key is accessible and visible to anyone who is involved in the commercial transaction of that article.

As mentioned earlier, this authentication key, whether used as a private key not visible or accessible to anyone other than who owns it, or used as an attached label affixed on an article of commerce, is extremely difficult to be cloned or reproduced by anyone. In order that the information content associated with an authentication key is accessible only to some people authorized by the owner of the authentication key, a second key is required. This second key could be an image capture device itself, which serves as an authorization key. Advantageously, the image capture device is a mobile electronic device having a solid-state imaging module of the type universally found in consumer electronic digital cameras. If the second dataset of the authentication key is stored in an RFID chip, then the mobile electronic device also has a built-in RFID reader so that the first dataset image and the data of the second dataset in the RFID chip may be captured simultaneously. The mobile electronic device is typically a cellular telephone or smart phone that has a built-in imaging module and a built-in RFID reader, but can also be a personal digital assistant (PDA), a tablet, a smart watch, a pair of smart glasses, a computer, an e-reader, a media player, or like electronic device having a built-in imaging module and a built-in RFID reader, especially one that is normally readily at hand to the average user. No special skill set is required for the user other than taking image/images and/or reading RFID data of the authentication key.

A master authorization electronic device 310 acts as a master authorization device associated with user 210. Device 310 acts as the master authorization key that can access all the information associated with the authentication key. Both of these keys, i.e., the authentication key 205 and the authorization key, are required by the user to access any information stored in the remote database. One key, without the other key, will not provide the information associated with the authentication key 205.

There may be other authorized device keys that may access partial information stored in the remote database. Thus, authorized device 2, identified by numeral 311, may only access the information content 321 stored as part of the total information 320; authorized device 3 identified by numeral 312, may only access the information content 322; authorized device 4, identified by numeral 31, may only access the information content 323; and authorized device n, identified by numeral 315, may only access the information content 325. Devices may access only the specific information content, or a combination of various information contents, as prescribed by the authentication key owner. Thus, device 312 may, for example, be authorized to access the combined information content 325, 322, and 321. Various permutations and combinations of information content may be accessible by authorized devices. The owner of the authentication key authorizes which device has what level of accessibility.

Figure 4:
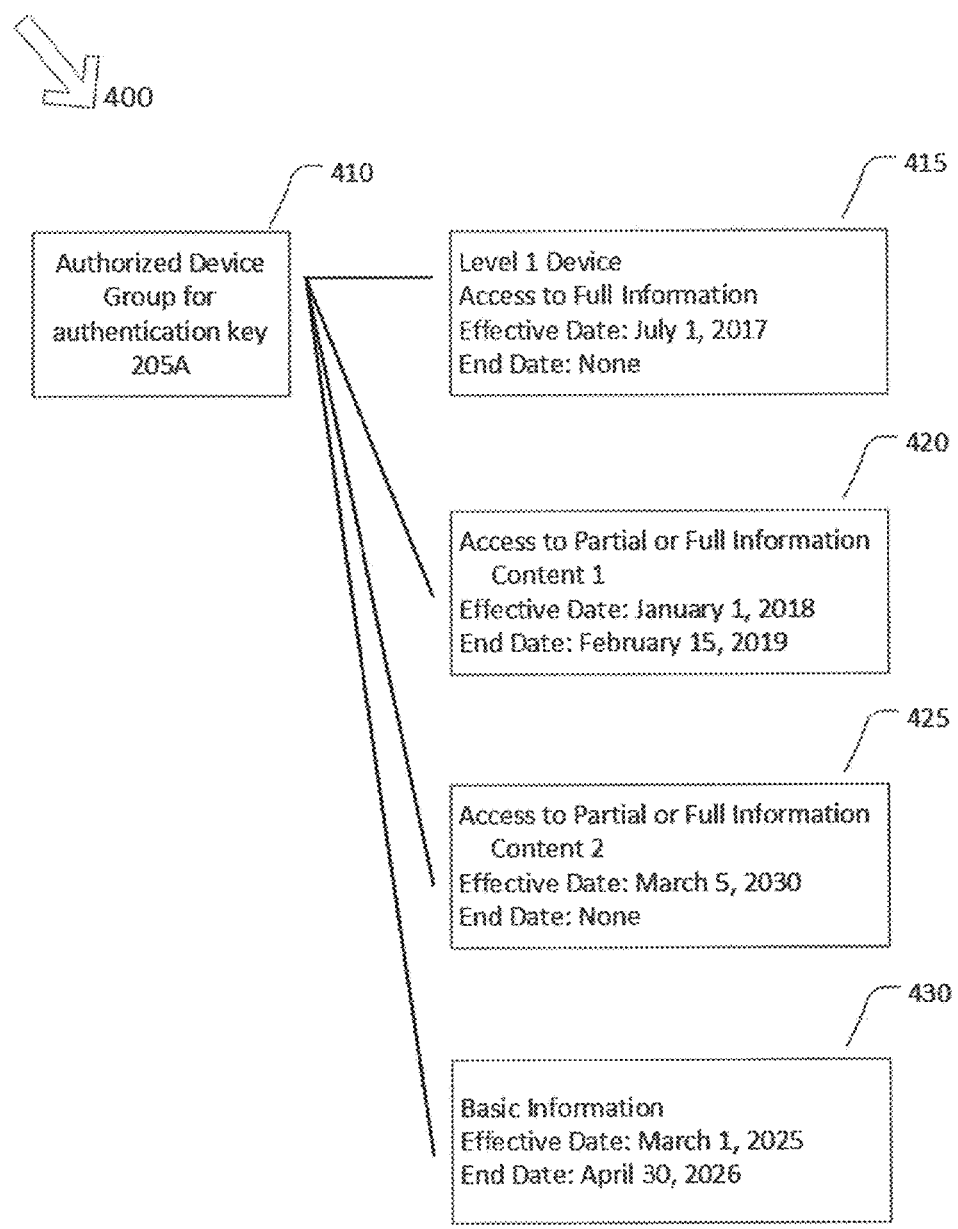
FIG. 4 is a diagram that illustrates how restrictions on various devices are managed and implemented.

Reference numeral 400 in FIG. 4 is a diagram that further illustrates how the restrictions on various devices are managed and implemented. As part of an authorized devices group 410, device 415 is a level 1 device associated with an authentication key 205A. This means that device 415 can access all the information associated with the key 205A. Device 415 may not be a level 1 device for another authentication key 205N and may be authorized to access only part of the information, or only some basic information, or no information associated with the key 205N, or any other authentication key. As a level 1 device, device 415 can access all the information content of key 205A and has no restriction on the effective date. The information content is available from now to an unlimited time in the future for the device 415 for the authentication key 205A.

Device 420, as part of the authorized user group 410, can either access only part of the information content 1, or have full access to the information content associated with the authentication key 205A. In addition, the authentication key owner can assign the effective date starting now or in the future, and also an end date when this effective date can be over. Thus, the mobile device 420 can access the information content associated with the key 205A starting on Jan. 1, 2018 and ending on Feb. 15, 2019. Device 425 can have access to information content 2 starting on Mar. 5, 2030 with no end date, while device 430 can only have access to some basic information starting on Mar. 1, 2025 and ending on Apr. 30, 2016.

Figure 5:
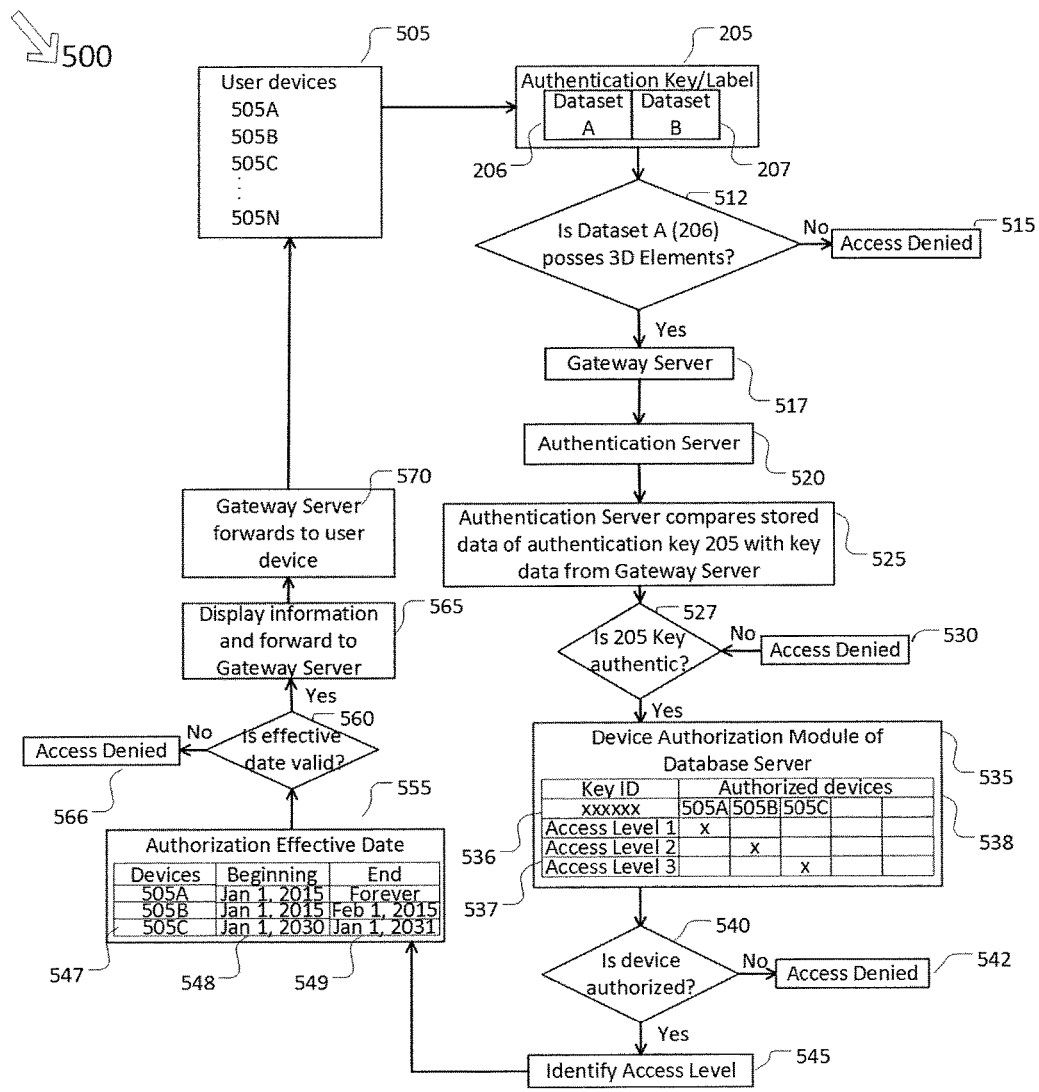
FIG. 5 is a flow chart that describes the process of how various devices interact with the authentication key.
Figure 6:
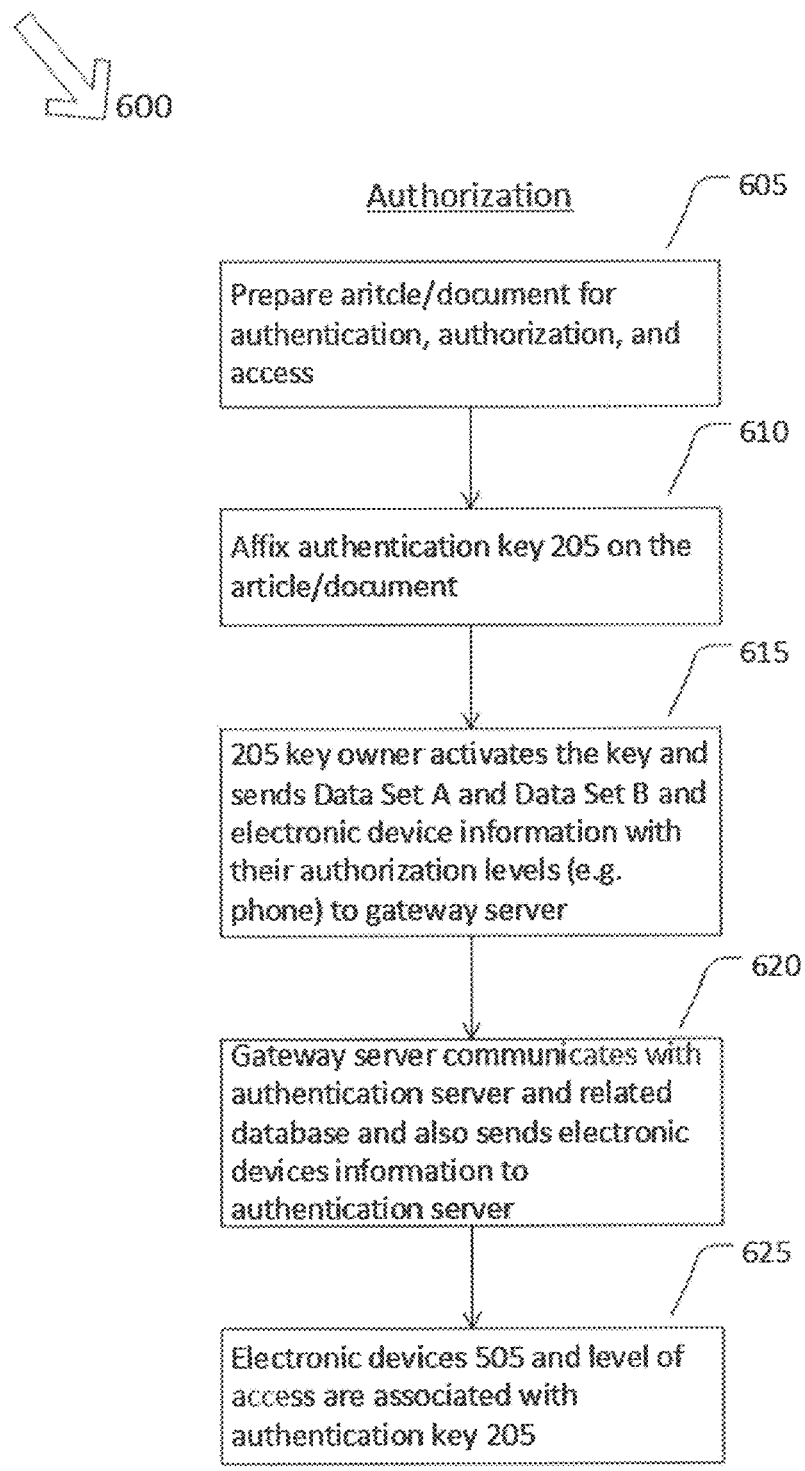
FIG. 6 is a block diagram that describes how an image capture device is authorized to fetch information associated with the authentication key.
Figure 7:
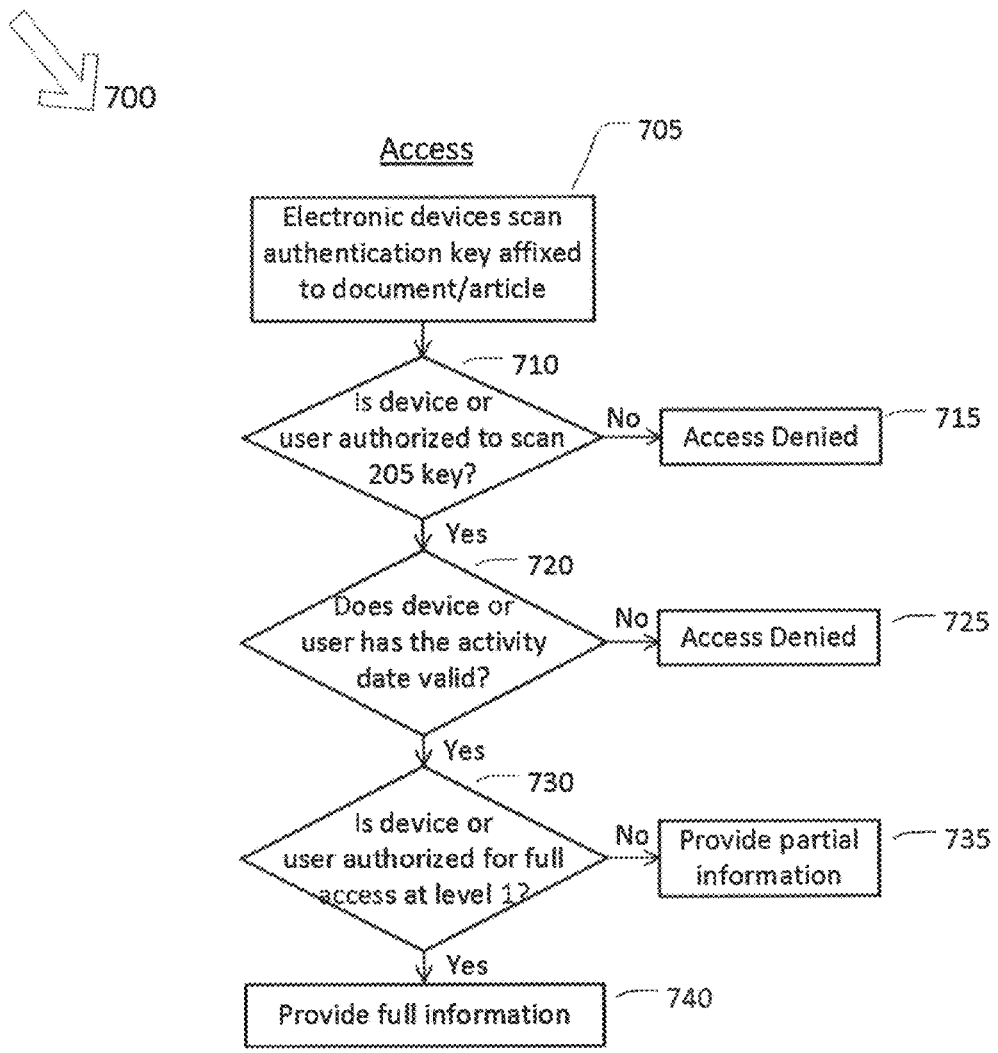
FIG. 7 is a flow chart that describes how access to the information associated with the authentication key is accessed by image capture devices.

FIG. 5 is a flow chart 500 that describes the process of how the authorization devices 505 in the form of user devices interact with the authentication key 205. The authorization devices 505A . . . 505N and the user devices 311, 312, 313, and 315 may be the same. However, for simplicity and clarification, numerals 505A . . . 505N are used to describe the authorization devices in the rest of this disclosure. As described earlier, the authentication key has two datasets 206 and 207. The first dataset 206 constitutes randomly distributed 3D particles that modify light. The second dataset 207 identifies the first dataset and could be a serial number of alphanumeric characters, or an RFID tag, a magstripe, or a barcode. The authentication key 205 is unique and very difficult to reproduce by anyone.

The user device 505 scans/reads the authentication key 205 through its image capture module and/or reads the RFID data through its RFID reader. The user device 505 analyzes the captured image/images in step 512 to verify that the first dataset 206 consists of 3D elements, preferably colored elements, and is not a photographic copy. If 3D elements are not ascertained in step 512, then the access of device 505 to proceed to connect to the remote database to fetch the associated information is denied in step 515. If the first dataset 206 is colored and is 3D, then it connects to the gateway server 517. The gateway server 517 forwards the authentication key datasets 206, 207 and the device/user identifying information and other data to the authentication server 520.

Gateway server 517 and the authentication server 520 may in practice exist as the same server, or as separate servers. The authentication server compares previously stored data of the authentication key 205 with the authentication key data being transmitted by the gateway server in step 525 to ascertain the authenticity of the key 205. If the key 205 is ascertained to be not authentic in step 527, then the access for the device 505 to fetch any information related to key 205 in the remote database is denied in step 530. If the key 205 is authenticated in step 527, then the authorization module of the database server of the authentication sever examines the authorization level of the device 505 in step 535. In the authorization module, for each key 205 identified by its identification number 536, a table lists the access levels as shown in 537. The electronic devices that read the authentication key 205 have the authorization at different levels as shown in 538. Thus, device 505A has the access level 1, device 505B has the access level 2, and the device 505C has access level 3.

Whether the device is authorized or not is determined at step 540. If the device is not authorized, then the access to get the information from the remote database is denied in step 542. If the device is authorized, then the access level of the device is obtained from the authorization module in step 545. In step 555, the effective date of each authorized device is examined. The effective date and time for each device are stored in the database of the authentication server. Thus, the devices 505A, B, C etc. are listed in 547, and their beginning effective dates are shown in 548, and the end dates are shown in 549. Device 505A had a beginning date of Jan. 1, 2015 and has no end date. Device 505B had a beginning date of Jan. 1, 2015 and an end date that expired on Feb. 1, 2015. Device 505C has a beginning date of Jan. 1, 2030 and will end on Jan. 1, 2031. The effective dates are controlled by the owner of the authentication key 205.

In step 560, the validity of the effective dates is checked, and if the device effective dates are not valid, then the access to the information content is denied in step 566. If the effective dates are valid, then the information content is forwarded to the gateway server in step 565. In step 570, the gateway server forwards the information content to device 505 for display.

Reference numeral 600 is a block diagram that further describes how the image capture device is authorized to fetch information associated with the authentication key 205. Any item/article/document that needs to be authenticated and accessed only by authorized devices with various levels of information available to different electronic devices is prepared in step 605. The authentication key or label 205 with datasets 206 and 207 is affixed on the document or item in step 610. The owner of the authentication key 205 activates the key and sends datasets 206 and 207 and electronic device information 505 to the gateway server in step 615. The gateway server communicates with the authentication server and database, and sends the authentication key data and the electronic device identification 505 and the level of access to the authentication server and database in step 620. Electronic devices and levels of access are associated with the authentication key 205 in step 625.

Reference numeral 700 is a flow chart that describes how the access to the information associated with the authentication key 205 is accessed by image capture devices. Electronic devices scan/read the authentication key 205 affixed to any document/article in step 705. At step 710, it is checked that whether the electronic device or the user is authorized to scan/read the key 205. If not, then the access to information associated with the key 205 is denied to such electronic devices as shown at step 715. If the device/devices are authorized, then at step 720, the activity date of the device is validated. If the activity date is not valid, then access to information is denied in step 725. If the activity date is valid, then, at step 730, it is checked whether the device/devices have the full level 1 access. If not, then only partial information is provided to the device/devices at step 735. If the device/devices have full access, then the complete information is accessible on the device/devices as shown in step 740.

Figure 8:
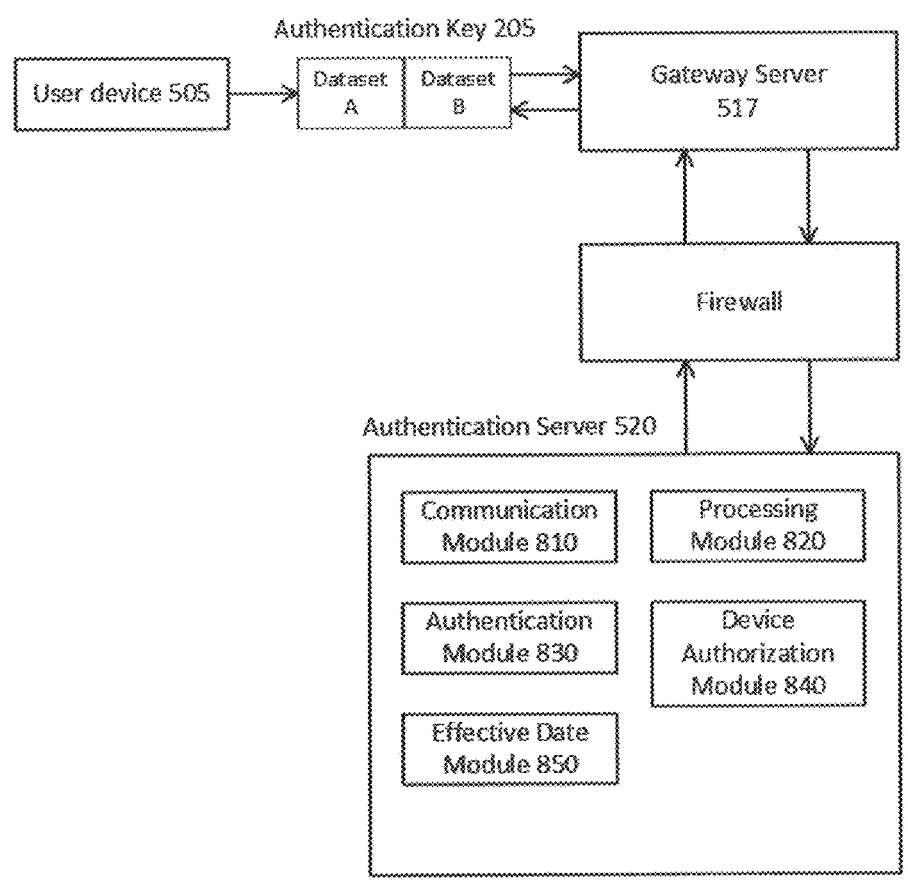
FIG. 8 is a flow chart depicting operation of an authentication server.

As best shown in the flow chart 800 of FIG. 8, the authentication server 520 includes hardware and software programmed to perform certain functions in response to software instructions contained in a computer readable medium. The authentication server 520 includes a communication module 810, a processing module 820, and an authentication module 830. A device authorization module is shown as 840, and the effective date module is represented by 850. The authentication server hardware may include communication interfaces, input devices, output devices, and buses to interconnect the components of the authentication server 520, such as processors, microprocessors, RAMs, dynamic storage devices, ROMs, and other storage devices.

The communication module 810 sends and receives information to/from the gateway server 517. The received information from the gateway server 517 may contain an address location in the authentication database module 830 and pattern image information associated with that address location. The processing module 820 processes instructions related to the operation of the authentication server 520, and retrieves the stored reference image information in the module 830 at the address identified by the captured information from the gateway server 517, and compares the stored reference image information in the database module 830 with the captured information received from the gateway server 517. If the captured authentication information coming from server 517 matches all attributes of the stored reference image corresponding to the address location, then the processing module 820 certifies that the authentication key 205 is authentic. If there is no match, then the processing module 820 denies access to user devices 505A . . . 505N.

If the key 205 is found to be authentic, then the device authorization module 840 of the database determines which user devices have access to the information associated with the authentication key 205 and at what level. For example, one user authorized device may have access to level 1 information, while another user authorized device may have access at level 2, and still another device may have level 3 access. There may be some devices that may have access at a combination of various levels.

Any other device that has not been authorized by the user will not have access to information associated with the authentication key 205. If the device is authorized, then the authorization effective date module 850 of the authentication server examines the effective dates of the devices associated with the authentication key 205. This module looks at the beginning date and time, and the ending date and time of the effective time interval. If the time and date of accessing the information associated with key 205 falls within the authorized effective date and time for the corresponding user device, this module allows the access to the information that is transferred to the user device through the gateway server 517. Otherwise, the access to the information is denied.

As an illustrative embodiment of the technology described in FIGS. 1 to 8, the discharging of patients in a hospital is discussed below. Discharging patients from the hospital is a complicated process with significant challenges. More than 40 million hospital discharges occur in the United States every year. Among Medicare patients, almost 20 percent who are discharged from a hospital are readmitted within 30 days. Typically, when patients are discharged, they can either go home or go to an alternate care facility. When discharged to home, the patient is provided with discharge instructions and self-administers medication, performs self-care activities, eats a proposed diet, and assumes responsibility to follow up with prescribed providers. Also, 41% of discharged patients had tests pending at discharge. This information must become available to patients or care givers as soon as the results from these tests become known. The primary mode of communication between the hospital care team and the aftercare providers is often the discharge summary, raising the importance of successful transmission of this document in a timely fashion.

Figure 9:
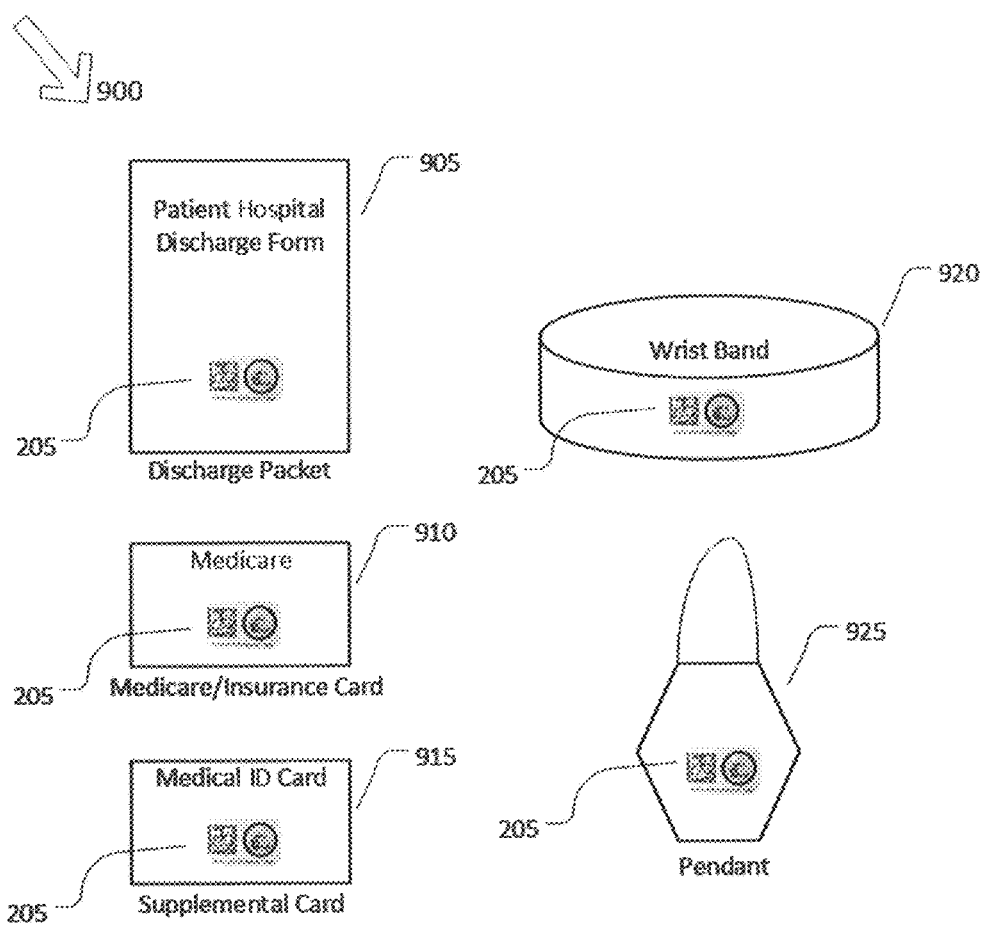
FIG. 9 is a set of objects on which the authentication key can be affixed.

Reference numeral 900 in FIG. 9 shows examples of where the authentication key 205 can be affixed to any identifying document/item that a patient has when discharged. Numeral 905 shows that the authentication key is attached to the discharge form or the discharge package that is given to a patient when he/she leaves the hospital to go to an alternative care facility or to home. The authentication key can also be attached to a Medicare/Medicaid or an insurance card that a patient carries with him/her as in 910. Alternately, the authentication key can be affixed to a supplemental card as in 915, or to a wristband as in 920, or to a pendant that a patient may have to access emergency care as in 925. Any item that a patient may have where the authentication key is affixed becomes a passport to access all the discharge information pertinent to the patient's stay in the hospital.

Thus, the information associated with the authentication key 205 applied onto a patient's discharge summary or patient information card can be accessed by any "authorized" user at any place, and at any time, using various electronic devices. The hospital can also communicate with the patient at any time to deliver updated information, or query the patient just by changing the information in the hospital portal and can also track and trace the patient's location in real time.

Figure 10:
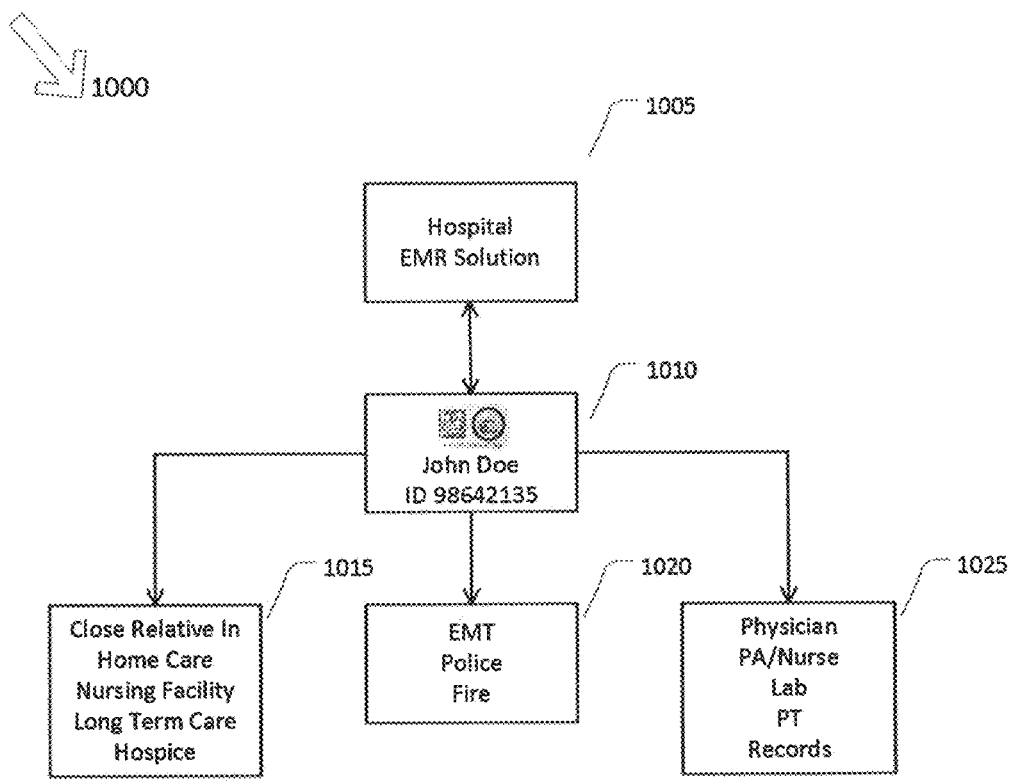
FIG. 10 is a chart that depicts the entities that may need discharge information about a patient.

Reference numeral 1000 in FIG. 10 is a chart that depicts the entities that may need discharge information about the patient. In the hospital EMR portal 1005, the discharge information of the patient John Doe is stored. The patient John Doe at the time of discharge is provided a discharge document/card that has the authentication key 205 attached to it as shown in 900. The patient John Doe has full access to the information associated with the authentication key 205. The patient can scan the key 205 on this document anytime, and anywhere, and get all the information pertinent to him/her as shown in step 1010.

In addition to having the authentication key in his/her possession, only the electronic device/devices approved by the patient will be authorized to scan the authentication key 205. Entities like a close relative, such as a spouse, daughter, or son, individual home care personnel, nursing facilities, long-term care facilities, hospice, etc., may also need to be able to access the discharge information. With the approval of the patient, devices belonging to these people may be authorized to access discharge information as in step 1015. Emergency ambulances, police, or fire may also need to access part of the information about the patient in case of emergency. Partial information can be accessed by these devices as shown in step 1020. A physician, PA/nurse, lab, etc., can access the required information as in step 1025.

Figure 11:
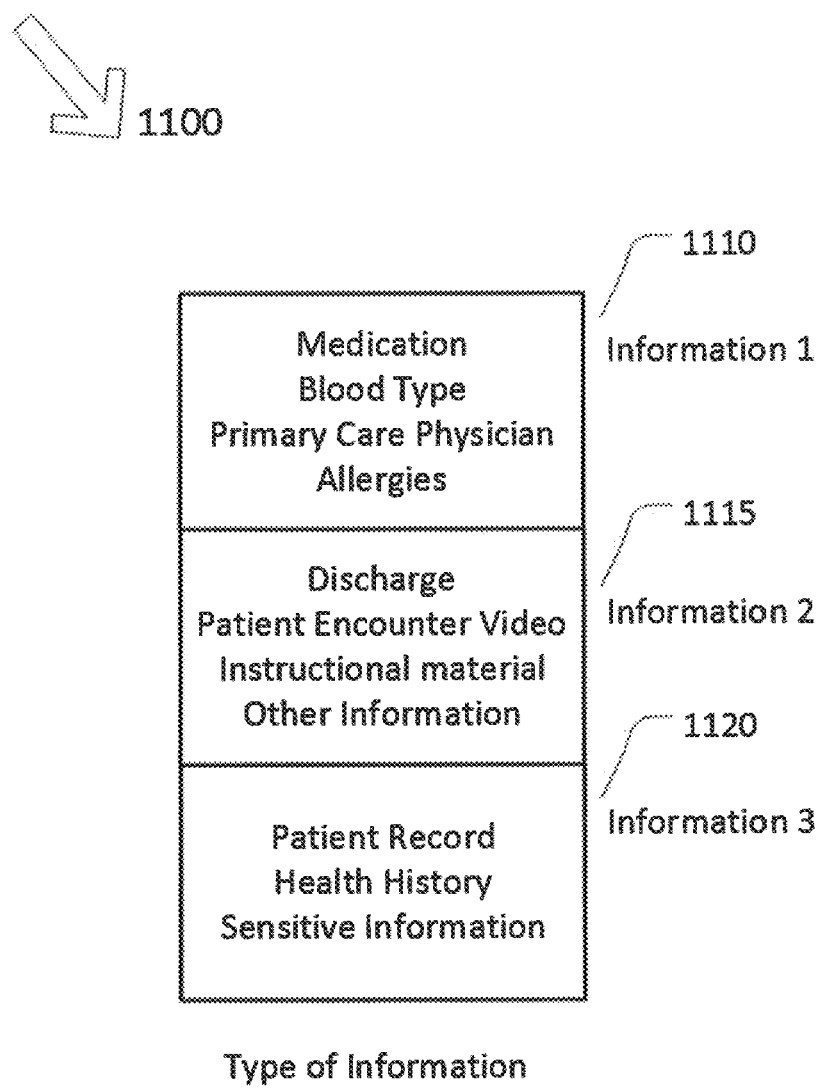
FIG. 11 is a diagram that shows a breakdown of the type of information related to patient discharge.

Reference numeral 1100 in FIG. 11 is a diagram that shows a breakdown of the type of information related to patient discharge. Information 1 shown in 1110 may be the basic information like blood type, medication being taken, the name of the primary care physician, allergies etc. that may be available to some entities in emergency situations. Information 2 shown in 1115 is detailed discharge information about the patient like the summary, patient encounter video, instructional material and other relevant information. In addition to this type of information accessible on the patient electronic device, it may also be made accessible to a close relative or nurses as agreed upon with the patient. Information 3 as shown in 1120 may include patient records, health history or other sensitive information. This type of information may be accessible only by the patient's or physician's electronic device. There may be further division of information than what is shown in 1100.

Figure 12:
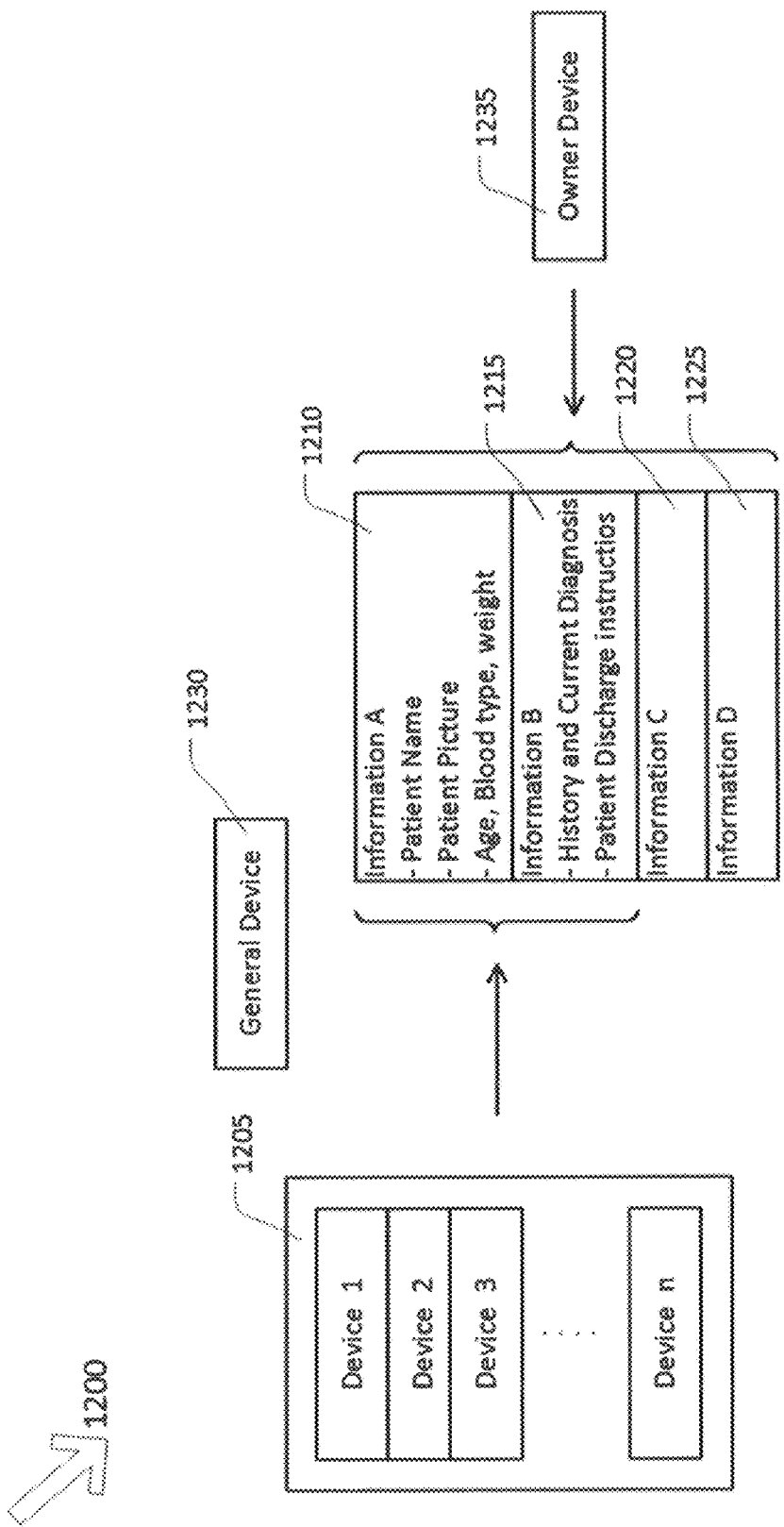
FIG. 12 is a diagram that depicts how various electronic devices can have one or more segments of information associated with the authentication key.

Reference numeral 1200 in FIG. 12 is a diagram that depicts how various electronic devices can have one, or a combination of more than one, segment of information associated with the authentication key 205. There are various devices authorized by the patient as shown in 1205. 1210 shows one type of information; 1215 shows another piece of information; and 1220 and 1225 show yet another pieces of information. Devices 1, 2 . . . n can access a combination of information in 1210 and 1215, but not the information in 1220 and 1225. A general device 1230 that is not authorized by the patient may or may not be permitted to access a part of the information such as in 1210. There are various combinations of the information elements that can be authorized to be accessible by different devices. Of course, the patient device 1235 will have access to all elements of the information.

Figure 13:
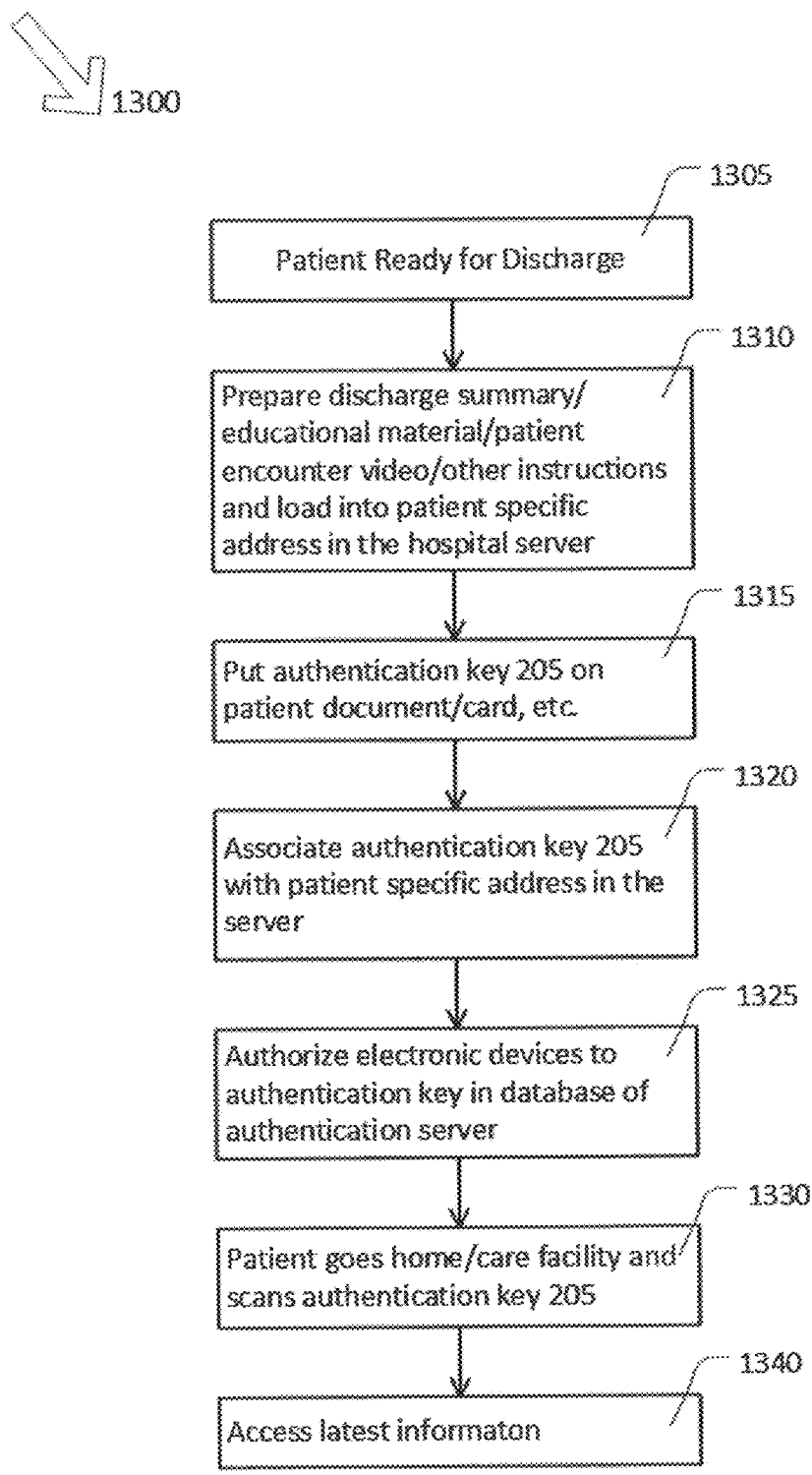
FIG. 13 is a flow chart that describes the process of patient discharge.

Reference numeral 1300 in FIG. 13 is a flow chart that describes the process of patient discharge. As shown in 1305, the patient is ready for discharge. The patient discharge summary, educational and instructional material, patient encounter video and other pertinent information are loaded into the hospital portal/server in step 1310. An authentication key 205 is attached to a patient discharge document/card/pendant/wristband, etc. in step 1315. The authentication key 205 is associated with the patient portal or patient specific computer address in the server in step 1320. With the agreement of the patient, access levels are assigned to electronic devices that are authorized by the patient and associated with the authentication key 205 in step 1325. Once the patient goes home or to a care facility, the patient's authorized device or any other device authorized by the patient scans the authentication key 205 and can access the latest information pertinent to patient discharge as in step 1340.

Figure 14:
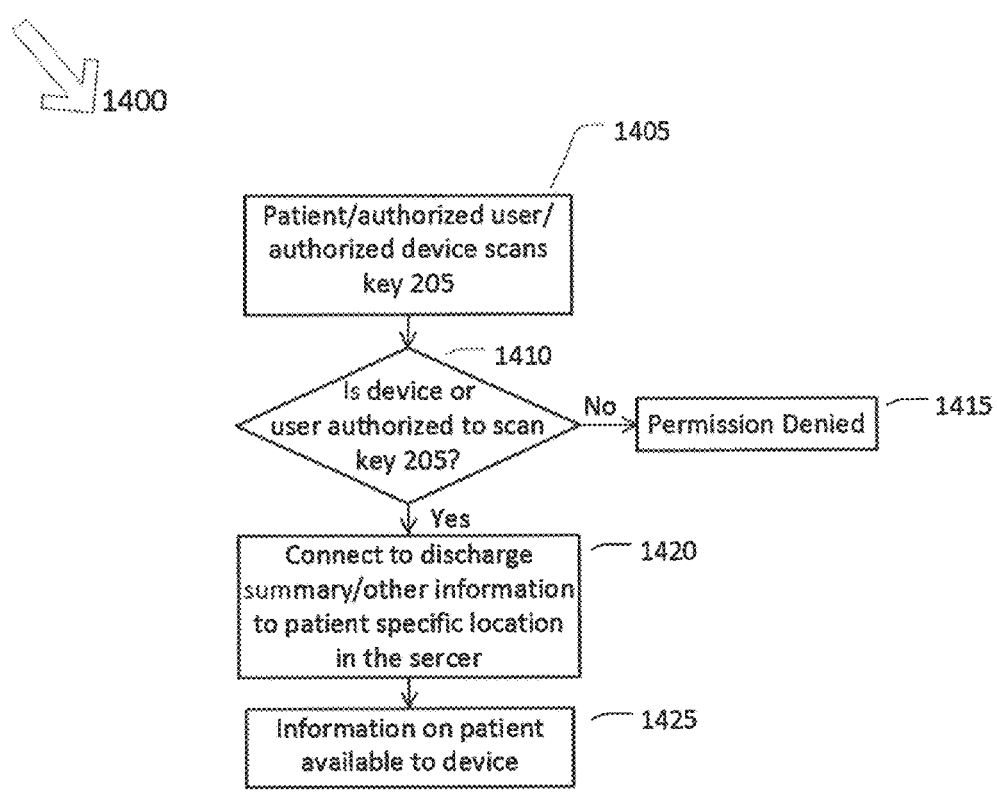
FIG. 14 is a flow chart that illustrates the access of patient discharge information by authorized electronic devices.

Reference numeral 1400 in FIG. 14 is a flow chart that further illustrates the access of the discharge information by authorized electronic devices. At step 1405, the patient's device or any authorized device scans the authentication key 205. At step 1410, it is checked if the devices or users are authorized to scan the authentication key 205. If not, then the permission to access the information is denied as shown in step 1415. If the devices are authorized, then they are connected to discharge information located at patient specific location in the server at step 1420. The patient discharge information or a subset of the information is then accessed on the authorized devices depending on the level of authorization in step 1425.

Figure 15:
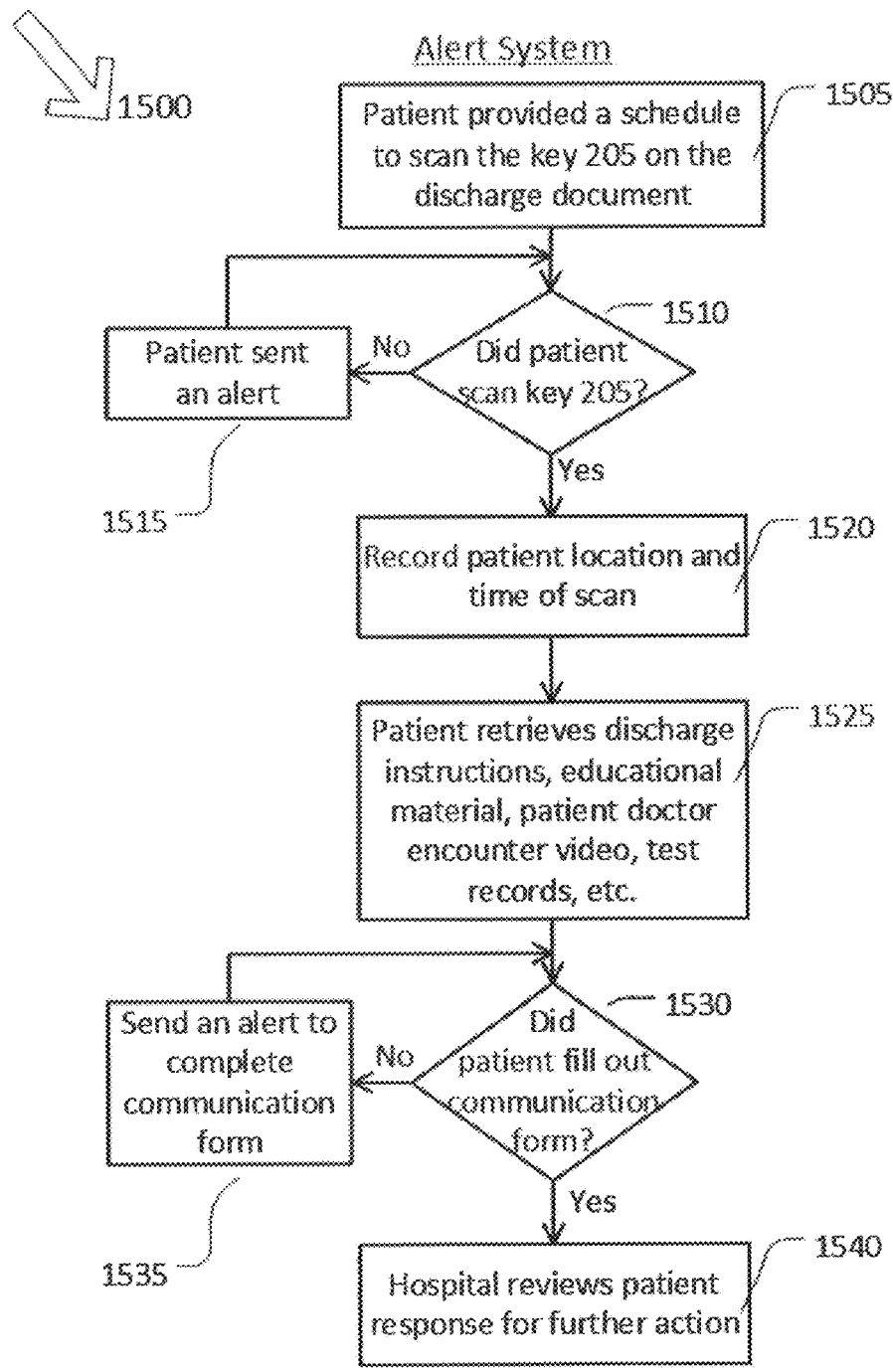
FIG. 15 is a flow chart that describes a communication system between a patient and a hospital.

Reference numeral 1500 in FIG. 15 is a flow chart that describes an alert system that can alert a patient if he/she is not following the hospital's instructions and, in reverse, also provides a communication vehicle from the patient back to the hospital. In step 1505, the patient is provided a schedule to scan the authentication key 205 affixed on the patient discharge document once the patient goes home or to a care facility. Soon after the specified interval, it is checked whether or not the patient has scanned the key 205 on their discharge document in step 1510. If the key 205 has not been scanned, then an alert is sent to patient's mobile device, e.g. smart phone, to scan the discharge document in step 1515.

The scanning of the key 205 at specified intervals is important because, as mentioned earlier, some of the test results are not available at the time of discharge. As the new information or test results become available and the patient portal is updated, this information will be available to the patient's authorized device(s) when the key 205 is scanned. If the key 205 on the document was scanned, then the patient's location and time are recorded in the server as shown in 1520. The patient's device or the authorized devices retrieve discharge information, any new test results or educational material, and/or a patient-doctor encounter video in step 1525.

In step 1530, it is checked whether the patient has filled out a communication form as required by the hospital in order to track patient progress. If not, then another alert is sent out to remind the patient that it is important to fill out the information as requested in step 1535. If the communication was provided by the patient, then the hospital reviews the patient response for further action in step 1540.

Reference numeral 1600 in FIG. 16 is a diagram that shows the internet of patient networks that a hospital can create and manage to improve patient outcome. Hospital 1605 has a number of patients 1 . . . n. Patient 1 is represented by 1610, patient 2 by 1620, patient 3 by 1630, and patient n by 1635. Patient 1 has several authorized devices such as 1610A, 1610B, 1610C, and 1610D that can access patient discharge information or other relevant patient information as described earlier. This creates a network of patient authorized devices. Similarly, other patients have their authorized devices to receive their information as shown by patient 2, 3, and n networks. Knowing who is accessing the information about which patient is important information to the hospital. The illustrated network of patient networks thus becomes a powerful tool to make sure that the patient is getting the best healthcare and to improve hospital profitability.

Forged will and trust documents are created without the deceased's knowledge and/or by forging the signatures of the deceased. The cause of forged wills, trusts, and financial documents are typically family problems, but there are numerous cases where elderly people with no close relatives or friends have been targeted by fraudsters in order to falsify a will in their name because, in these cases, there may be nobody to challenge the will. Forgery of a will is notoriously hard to prove in court. Generally, those cases which are won rely on the testimony of a handwriting expert who has found discrepancies between the signature on the will and the actual signature of the deceased.

Recently, a high profile case of the guilty verdict for Brooke Astor's son Marshall and his lawyer are the case in point. Marshall was convicted of defrauding his mother and stealing millions of dollars from her estate and Francis X. Morrissey Jr., a lawyer who did estate planning for Marshall, was convicted of forging Astor's signature on an amendment to her will.

Forensic document examiners suggest that forgery cases are more common than proven cases of it. They often originate with an adult child who, feeling short-changed in a parent's will, accuses a sibling of doctoring the document.

Tools of the trade for document examiners include infrared light that can reveal whether multiple inks are present on a document, or whether there have been alterations or additions to it. High-powered microscopes are used to detect whether a writer stopped and started a lot during a signature—a possible sign of forgery.

Courts are not handwriting experts and cannot be expected to know when a signature is authentic or not. Probate litigation attorneys will bring in handwriting experts, with each side's expert squaring off about the validity of the signature. The experts look at amount of pressure, angle and length of strokes, points of lift, and direction of strokes of the signature. They will look for irregularities or alterations in the document.

Most of the time, the signatures are only on the last page, but the wills and trusts are several pages long. A fraudster has to simply replace the pages in the will and trusts without changing the signature page in order to change the meaning of the document. Thus, there are no technology based solutions that prevents falsification of legal documents.

Typically, it is the last page of a will, where signatures of the will/trust owner and the witnesses are affixed. However, a new signature page can be created and the signatures of the will owner and the witnesses can be forged.

To assure that the will or trust documents cannot be forged, authentication keys 205A . . . 205N are affixed to each page of the document. The writer of the will and trust may limit access to who can authenticate the document to the trustee's electronic device or electronic devices of the individuals who are the beneficiaries named in the will or trust. This prevents forging of any page of the document, because if someone tries to remove the key 205 from any page, to paste on another forged page of the document, then the key 205 will be destroyed due to destructive nature of the adhesive and the substrate material that is used to create the authentication key 205.

The invention claimed is:

1. An object authentication method, comprising:
associating a plurality of authentication tags with a corresponding plurality of objects;
configuring each tag with a first dataset comprised of a random distribution of three-dimensional elements, and with a second dataset comprised of machine-readable data elements, the first and second datasets of the tags together comprising respective authentication keys that uniquely identify the respective objects;
storing key data indicative of the authentication keys in a database;
configuring a plurality of mobile devices to read the datasets of the authentication keys;
storing access control parameters in the database, the stored access control parameters being indicative of conditions under which the datasets of the authentication keys are successfully read;
reading the datasets of at least one of the authentication keys with at least one of the mobile devices to obtain read key data;
sending device data indicative of the at least one mobile device that is reading the datasets of at least one authentication key to the database;
determining if the read key data matches the stored key data, and if the sent device data matches at least one of the stored access control parameters; and
authenticating that the respective object is genuine when both the read key data matches the stored key data, and when the sent device data matches the at least one stored access control parameter.

2. The method of claim 1, wherein the reading the datasets of at least one of the authentication keys is performed by configuring each mobile device as a portable, handheld, image capture device, and by aiming the image capture device at each key to capture return light from the respective three-dimensional elements; wherein the determining is performed by processing the captured return light from the three-dimensional elements to obtain an image pattern; wherein the stored key data includes an authentication pattern signature indicative of the captured return light from the three-dimensional elements; wherein the respective data elements from each key are light-reflective and encoded with an address identifier uniquely associated with the authentication pattern signature; wherein the reading by the image capture device also captures return light from the data elements; and wherein the determining is further performed by decoding the address identifier, by locating the authentication pattern signature associated with the decoded address identifier, and by comparing the image pattern with the located authentication pattern signature.

3. The method of claim 2, wherein the stored authentication pattern signature is colored, wherein the configuring of each tag is performed by coloring the three-dimensional elements, wherein the processing of the return light captured from the three-dimensional elements obtains a colored image pattern, and wherein the comparing is performed by matching the colored image pattern with the colored authentication pattern signature.

4. The method of claim 1, and configuring the access control parameters to identify which of the mobile devices is authorized to read which of the datasets of the authentication keys, and wherein the sending of the device data is performed by sending a device identifier indicative of the at least one mobile device that is reading the datasets of at least one authentication key to the database, and wherein the authenticating is performed when the sent device identifier confirms that the at least one mobile device is authorized.

5. The method of claim 4, and configuring the access control parameters to identify how much information associated with the authentication keys is accessible, and wherein the authenticating is performed when the sent device identifier confirms how much of the information associated with the at least one authentication key is accessible.

6. The method of claim 4, and configuring the access control parameters to identify a time period during which information from the authentication keys is accessible, and wherein the authenticating is performed when the sent device identifier confirms the time period for which the information from the at least one authentication key is accessible.

7. The method of claim 1, and monitoring whether the reading was performed, and sending a message to a user of the at least one authorized device when the reading was not performed.

8. The method of claim 1, wherein the associating is performed by affixing at least one of the authentication tags to at least one of the objects, and selecting the object from a group consisting of documents, cards, and physical items.

9. The method of claim 1, wherein the machine-readable data elements of the second dataset of each tag is encoded in at least one radio frequency identification (RFID) chip, and wherein the reading by each mobile device also captures information stored in the RFID chip.

10. The method of claim 9, wherein the capturing of the information stored in the RFID chip from the data elements is performed simultaneously with the capturing of return light from the three-dimensional elements.

* * * * *